United States Patent
Han et al.

(10) Patent No.: US 10,083,336 B2
(45) Date of Patent: Sep. 25, 2018

(54) FINGERPRINT SENSOR INTEGRATED TYPE TOUCH SCREEN PANEL

(71) Applicant: LG Display Co., Ltd., Seoul (KR)

(72) Inventors: Manhyeop Han, Seoul (KR); Moonbong Song, Seoul (KR); Jiho Cho, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 393 days.

(21) Appl. No.: 14/950,871

(22) Filed: Nov. 24, 2015

(65) Prior Publication Data

US 2016/0350570 A1 Dec. 1, 2016

(30) Foreign Application Priority Data

May 28, 2015 (KR) .......................... 10-2015-0075340

(51) Int. Cl.
*G06K 9/00* (2006.01)
*G06F 3/044* (2006.01)
*G06F 3/041* (2006.01)

(52) U.S. Cl.
CPC ........... *G06K 9/0002* (2013.01); *G06F 3/044* (2013.01); *G06F 3/0416* (2013.01)

(58) Field of Classification Search
CPC ...... G06K 9/0002; G06F 3/0416; G06F 3/044
See application file for complete search history.

(56) References Cited

U.S. PATENT DOCUMENTS

| | | | | |
|---|---|---|---|---|
| 8,872,526 B1* | 10/2014 | Hoshtanar | ............ | G06K 9/0002 324/658 |
| 2006/0119369 A1* | 6/2006 | Kawahata | ............ | G06K 9/0002 324/662 |
| 2007/0092117 A1* | 4/2007 | Qi | ........................ | G06K 9/0002 382/124 |
| 2009/0067684 A1* | 3/2009 | Mainguet | ............. | G06K 9/0002 382/124 |
| 2012/0092350 A1* | 4/2012 | Ganapathi | .......... | G02B 26/0833 345/501 |
| 2012/0105081 A1* | 5/2012 | Shaikh | ................ | G06K 9/0002 324/686 |
| 2013/0287272 A1* | 10/2013 | Lu | ........................... | G06F 3/041 382/124 |
| 2016/0188032 A1* | 6/2016 | Lin | ........................ | G06F 3/044 345/174 |

* cited by examiner

*Primary Examiner* — Sejoon Ahn
(74) *Attorney, Agent, or Firm* — Fenwick & West LLP (57) ABSTRACT

A touch sensing device comprises a plurality of first touch electrodes and a plurality of second touch electrodes located in an active area of the touch sensing device, the plurality of first touch electrodes and the plurality of second touch electrodes arranged in a first direction. The touch sensing device also includes a plurality of third touch electrodes located in the active area and arranged in a second direction that crosses the first direction. The first touch electrodes, second touch electrodes, and third touch electrodes have a first resolution for sensing touch in the active area. The touch sensing device also includes a plurality of combination touch and fingerprint electrodes located in the active area, the plurality of combination touch and fingerprint electrodes having a second resolution for sensing both touch and a fingerprint in the active area and the second resolution being higher than the first resolution.

21 Claims, 6 Drawing Sheets

FIG. 1

RELATED ART

FIG. 2

RELATED ART

FINGERPRINT SENSOR INTEGRATED TYPE TOUCH SCREEN PANEL

This application claims priority under U.S.C. § 119(a) to Korean Patent Application No. 10-2015-0075340 filed on May 28, 2015, which is incorporated by reference herein in its entirety.

BACKGROUND

Field of Technology

This disclosure relates to a fingerprint sensor integrated type touch screen panel, in particular a fingerprint sensor integrated type touch screen panel capable of perceiving a fingerprint.

Discussing of the Related Art

In recent years, computer based systems applied to various utilities, such as tablet personal computers (PCs), smart phones, personal digital assistants (PDAs), automated teller machines (ATMs), and information systems have been developed according to growth of computer techniques. In general, the computer based systems store various data including secret information such as business information and business secret as well as personal information related to private affairs. Accordingly, it is required to strengthen security to protect the secret information.

To this end, fingerprint sensors have been developed to strengthen security by performing system registration or certification using fingerprints of a human being.

The fingerprint sensor is a sensor capable of sensing fingerprints of a human being. The fingerprint sensor is classified into an optical fingerprint sensor and a capacitive fingerprint sensor.

The optical fingerprint sensor utilizes a principle in which a light source such as a light emitting diode (LED) emits light, and senses the light reflected from ridges and valleys of a fingerprint through CMOS image sensors. There are some problems such as an increase in size due to the use of LEDs and rise in product cost due to the use of expensive light source.

The capacitive fingerprint sensor utilizes difference of electric charges charged between ridges and valley of the finger contacted thereto.

U.S. Patent Publication No. 2013/0307818 published on Nov. 21, 2013, and entitled "Capacitive Sensor Package" is known as the related art capacitive fingerprint sensor.

The published capacitive fingerprint sensor is constructed as an assembly form engaged with a particular push button. The capacitive fingerprint sensor includes a silicon wafer to which a circuit for measuring an electrostatic capacitance between the fingerprint (ridges and valleys) and a capacitive plate is printed.

In general, it is necessary for the capacitive fingerprint sensor to have a high resolution sensor array and an IC for a fingerprint recognition because the finger's ridges and valleys have a very minute size of about 300 μm to about 500 μm. To this end, the capacitive fingerprint sensor utilizes the silicon wafer for integrating the IC with the sensor array.

However, in case of integrating the IC with the high resolution sensor array using the silicon wafer as described in the US Patent Publication No. 2013/0307818, it is necessary for the capacitive fingerprint sensor to have an assembly construction for coupling the fingerprint sensor with a push button. Accordingly, there are some problems such as a complicated construction and an increase in bezel area (non-display area) in the optical fingerprint sensor due to the assembly construction. Also, there are other problems including the issue that thickness is increased and an area for sensing the fingerprint depends on the size of the push button (e.g., a home key of a smart phone) because the push button overlaps the fingerprint sensor.

To resolve the problems mentioned above, technologies have been developed for utilizing an area of a touch sensor screen as an area of a fingerprint sensor for identifying a fingerprint. As the techniques, there are known U.S. Pat. No. 8,564,314 issued on Oct. 22, 2013 and entitled "Capacitive Touch Sensor for Identifying a Fingerprint", and Korea Patent No. 10-1432988 issued on Aug. 18, 2014 and entitled "Fingerprint Integrated type Capacitive Touch Screen".

Figure 1:
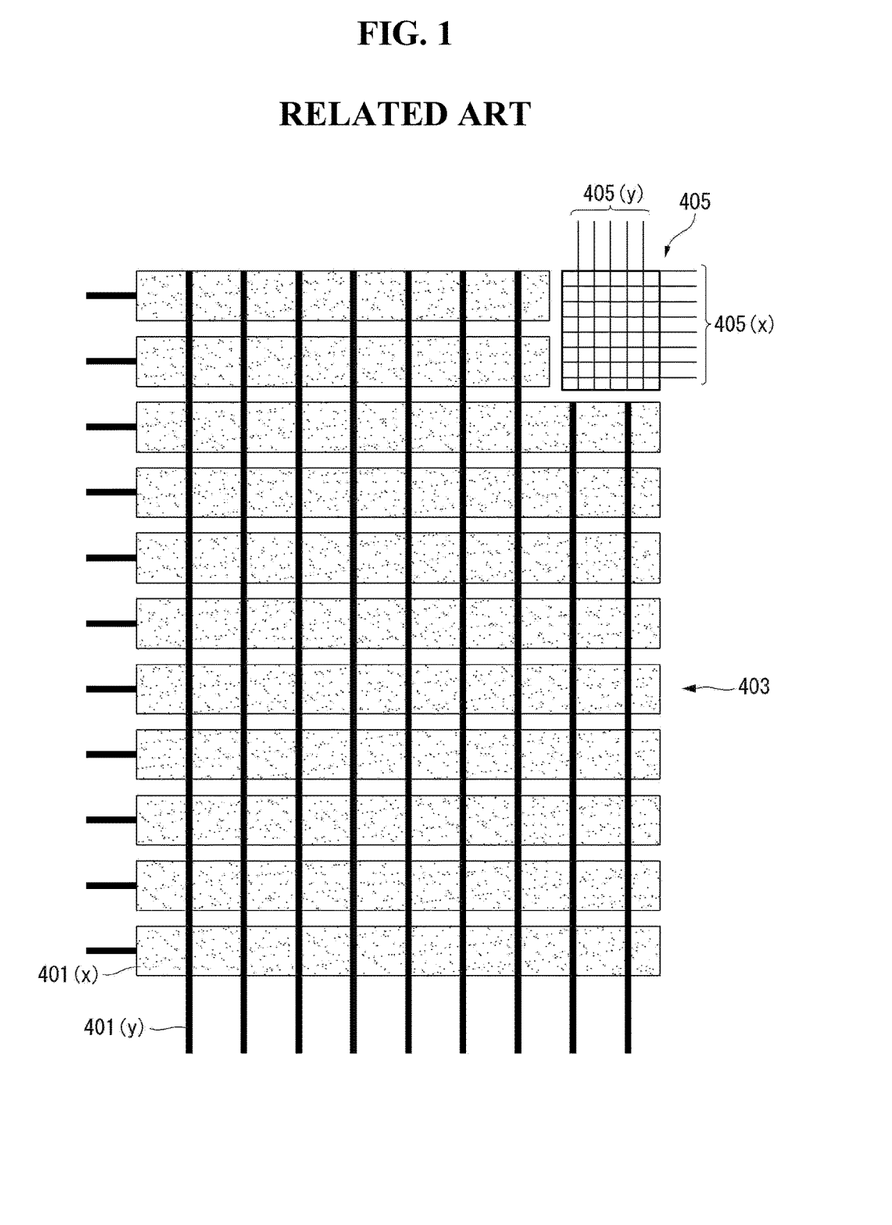
FIG. 1 is a plan view schematically illustrating an arrangement between driving electrodes and sensing electrodes of a capacitive touch sensor according to a related art.

FIG. 1 is FIG. 5 shown in U.S. Pat. No. 8,564,314, and is a plan view schematically illustrating an arrangement of driving electrodes and sensing electrodes of the capacitive sensing panel, and the FIG. 2 is FIG. 2 shown in Korean Patent No. 10-1432988, and is a plan view illustrating the fingerprint sensor integrated type capacitive touch screen.

Referring to FIG. 1, the capacitive touch sensor includes a touch position sensor 403 and a fingerprint sensor 405. The touch position sensor 403 has touch driving electrodes 401(x) and touch sensing electrodes 401(y). However, in the capacitive touch sensor 400, the fingerprint sensor 405 is disposed only in a portion of the display area. Therefore, the area where the fingerprint sensor 405 is disposed cannot be acted as a touch area. Also, a touch performance may be degraded at a peripheral region of the fingerprint sensor 405.

Figure 2:
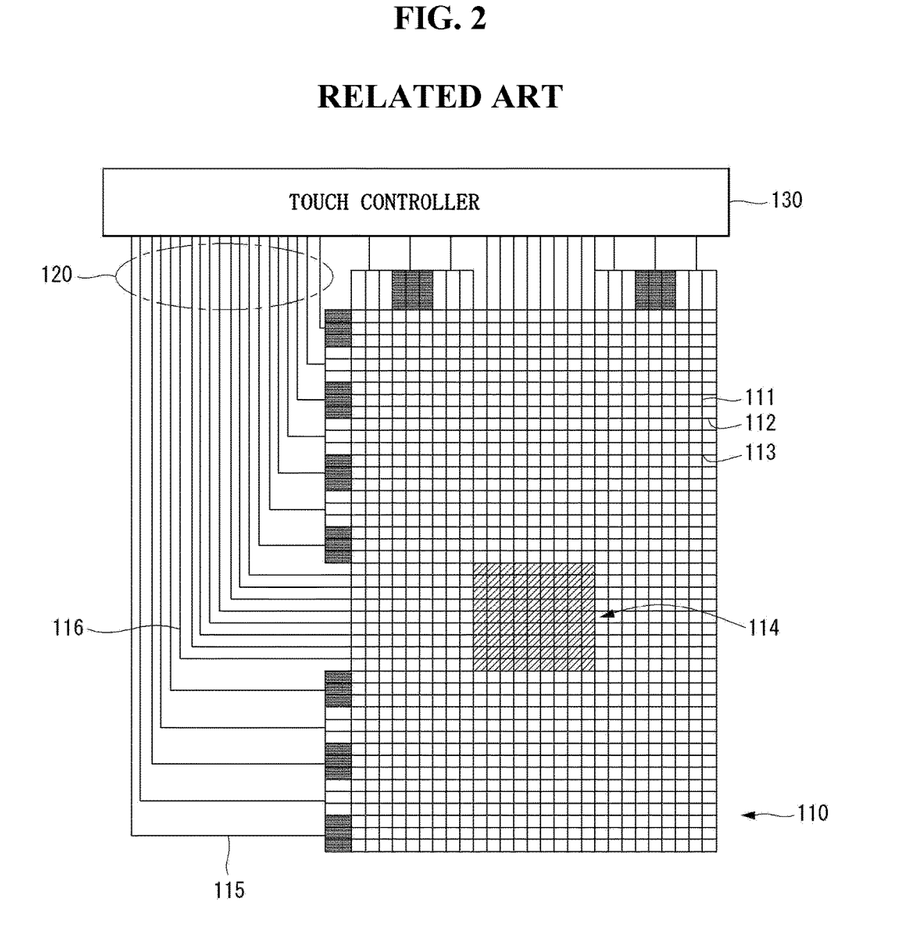
FIG. 2 is a plan view illustrating a fingerprint sensor integrated type capacitive touch screen panel according to another related art.

Referring to FIG. 2, the fingerprint sensor integrated type capacitive touch screen includes a touch panel 110, electrode connecting lines 120 and a touch controller 130. The touch panel 110 includes fine channels 113 formed by combinations of the first channel electrodes 111 and the second channel electrodes 112. The fine channels 113 have first fine channels and second fine channels. The first fine channels are disposed in the display area excluding the region of the fingerprint sensor 405. The second fine channels are disposed in the region of the fingerprint sensor 405. The first fine channels are grouped in plural and functioned as touch channels 115. The second fine channels are functioned as fingerprint recognition channels 116. However, in the fingerprint sensor integrated type capacitive touch screen, mutual capacitances between the first channel electrodes 111 and the second channel electrodes 112 are significantly increased because of the second fine channels functioned as the touch channels 115. According to the increase of the mutual capacitance, touch sensibilities of the fingerprint sensor integrated type capacitive touch screen are degraded, thereby making touch recognition impossible when a touch event is performed.

SUMMARY

Embodiments of the disclosure provide a fingerprint sensor integrated type touch screen panel capable of preventing the fingerprint sensor region from being a dead zone as well as preventing touch sensibilities from being degraded due to the increase of the mutual capacitance.

According to exemplary embodiments of the disclosure, it is possible to design the fingerprint sensor integrated type touch screen panel having a narrow bezel area because it is unnecessary to have a fingerprint sensor region in the bezel area.

Also, it is possible to prevent a dead zone from being generated in a display area (or active area) of the fingerprint sensor integrated type touch screen panel because combination fingerprint and touch electrodes are arranged in a fingerprint and touch area of the display area to implement the touch and fingerprint recognitions.

Also, it is possible to prevent the touch sensibilities the fingerprint sensor integrated type touch screen panel from being degraded because the touch electrodes consist of large patterns and the fingerprint/touch patterns consist of fine patterns.

In one embodiment a touch sensing device comprises a plurality of first touch electrodes located in an active area of the touch sensing device, the plurality of first touch electrodes arranged in a first direction. The touch sensing device also includes a plurality of second touch electrodes located in the active area of the touch sensing device, the plurality of second touch electrodes arranged in the first direction. The touch sensing device also includes a plurality of third touch electrodes located in the active area of the touch sensing device and arranged in a second direction that crosses the first direction, the plurality of third touch electrodes overlapping both the plurality of first touch electrodes and the plurality of second touch electrodes in the active area, and the plurality of first touch electrodes, the plurality of second touch electrodes, and the plurality of third touch electrodes having a first resolution for sensing touch in the active area. The touch sensing device also includes a plurality of combination touch and fingerprint electrodes located in the active area of the touch sensing device, the plurality of combination touch and fingerprint electrodes having a second resolution for sensing both touch and a fingerprint in the active area and the second resolution being higher than the first resolution. The touch sensing device also includes a plurality of first routing lines connected to the plurality of first touch electrodes and the plurality of third touch electrodes. The touch sensing device also includes a plurality of second routing lines connected to the plurality of second touch electrodes and the plurality of combination touch and fingerprint electrodes.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Hereinafter, exemplary embodiments of this disclosure will be described in detail with reference to the accompanying drawings, wherein same reference numerals may be used to denote the same or substantially the same elements throughout the specification and the drawings.

Figure 3:
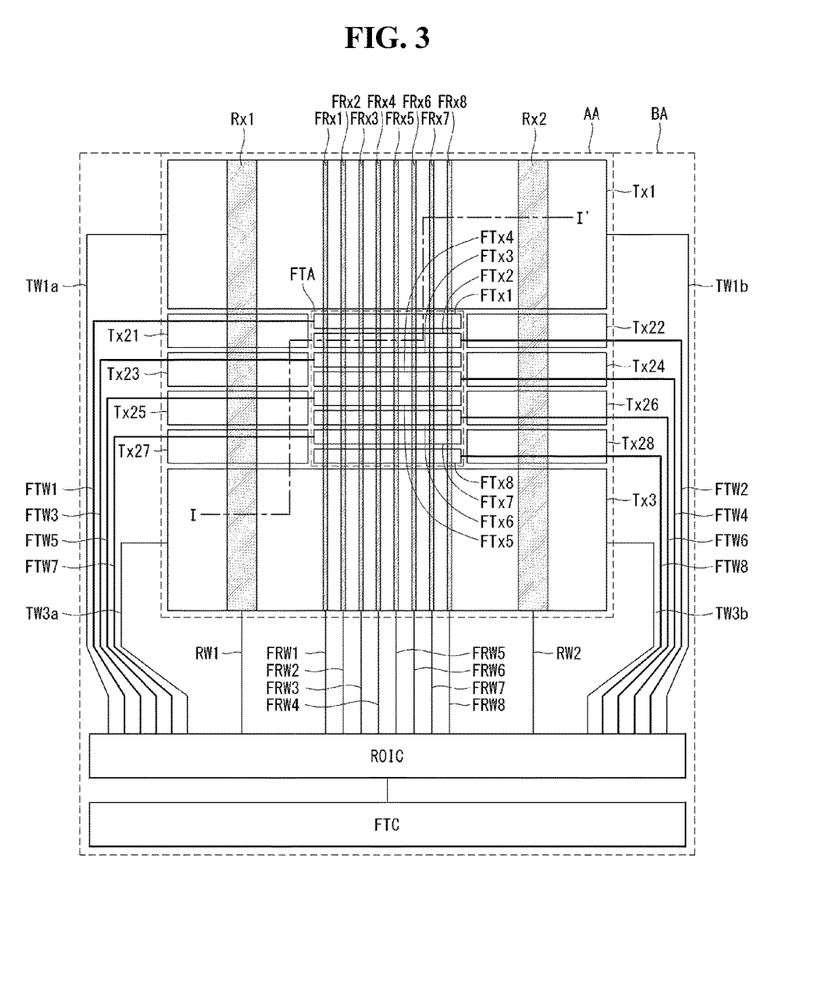
FIG. 3 is a plan view illustrating a fingerprint sensor integrated type touch screen panel according to an embodiment of the disclosure.

A fingerprint sensor integrated type touch screen panel according to an embodiment of the invention is described in detail with reference to FIGS. 3 and 4. FIG. 3 is a plan view illustrating a fingerprint sensor integrated type touch screen panel according to an embodiment of the disclosure, and FIG. 4 is a cross-sectional view taken along line I-I' of FIG. 3 according to one embodiment.

Figure 4:
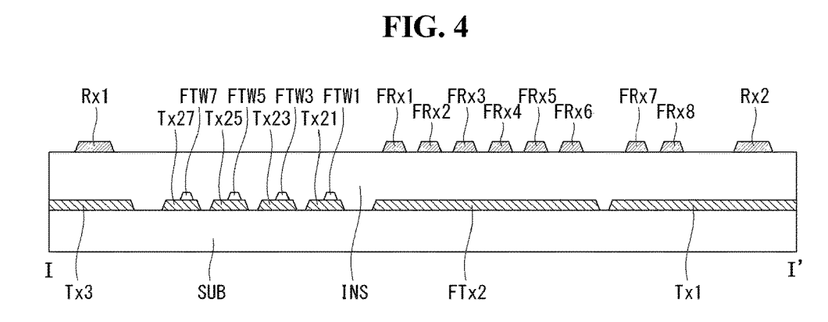
FIG. 4 is a cross-sectional view taken along line I-I' of FIG. 3 according to an embodiment of the disclosure.

Referring to FIGS. 3 and 4, the fingerprint sensor integrated type touch screen panel according to an embodiment of the disclosure includes an active area AA in which touch electrodes and combination fingerprint and touch electrodes are disposed, and a bezel area BA disposed outside the active area AA. The active area AA includes a combination fingerprint and touch area FTA in which the combination fingerprint and touch electrodes FTx1 to FTx8 and FRx1 to FRx8 are disposed. In one embodiment, the combination fingerprint and touch electrodes FTx1 to FTx8 and FRx1 to FRx8 have a resolution for sensing a fingerprint. The resolution of the combination fingerprint and touch electrodes is high enough so that the combination fingerprint and touch electrodes can sense the ridges and valleys of a finger which are very minute in size. The combination fingerprint and touch area FTA occupies a portion of the active area AA. In the description of the embodiment, it is described that the combination fingerprint and touch area FTA is disposed at center portion of the active area AA, but the position of the fingerprint/touch area FTA is not specified thereto. The combination fingerprint and touch area FTA may be disposed at any position of the active area AA such as corner portions or side portions.

First fingerprint and touch electrodes FTx1 to FTx8 and second fingerprint and touch electrodes FRx1 to FRx8 are disposed in the combination fingerprint and touch area FTA of the active area AA. One group (FTx1 to FTx8 in the embodiment of the disclosure) of first fingerprint and touch electrodes FTx1 to FTx8 is disposed only in the combination fingerprint and touch area FTA, and the other group (FRx1 to FRx8 in the embodiment of the disclosure) of second fingerprint and touch electrodes FRx1 to FRx8 is extended from the fingerprint and touch area FTA to the active area AA outside the fingerprint and touch area FTA. That is, the second fingerprint and touch electrodes FRx1 to FRx8 extend across a length of the active area and overlaps a portion of the first touch electrodes.

The first fingerprint and touch electrodes FTx1 to FTx8 are arranged in parallel to first direction (e.g., x-axis direction or horizontal direction). The second fingerprint and touch electrodes FRx1 to FRx8 are arranged in parallel to a second direction (e.g., y-axis direction or vertical direction) crossing over the first direction. The first fingerprint and touch electrodes FTx1 to FTx8 are disposed to cross over the second fingerprint/touch electrodes FRx1 to FRx8 with an insulation layer INS between the first fingerprint and touch electrodes FTx1 to FTx8 and the second fingerprint/touch electrodes FRx1 to FRx8.

First touch electrodes Tx1, Tx21 to Tx28 and Tx3 and second touch electrodes Rx1 and Rx2 are disposed in the active area AA excluding the combination fingerprint and touch area FTA. The first touch electrodes Tx1, Tx21 to Tx28 and Tx3 are arranged in the first direction and the second touch electrodes Rx1 and Rx2 are arranged in the second direction. The first touch electrodes Tx1, Tx21 to Tx28 and Tx3 are disposed to overlap the second touch electrodes Rx1 and Rx2 with an insulation layer INS between the first touch electrodes Tx1, Tx21 to Tx28 and Tx3 and the second touch electrodes Rx1 and Rx2. The first touch electrodes Tx1, Tx21 to Tx28, and Tx3 and the second touch electrodes Rx1 and Rx2 have a resolution for sensing touch in the active area AA. The resolution of the first touch electrodes Tx1, Tx21 to Tx28, and Tx3 and the second touch electrodes Rx1 and Rx2 is lower than the resolution of the combination fingerprint and touch electrodes since the first touch electrodes Tx1, Tx21 to Tx28 and Tx3 and the second touch electrodes Rx1 and Rx2 are merely sensing touch. In contrast, the combination fingerprint and touch electrodes require a higher resolution in order to sense the ridges and valleys of a finger which are very minute in size.

A width and a length of 1-1 touch electrode Tx1 of the first touch electrodes Tx1, Tx21 to Tx28 and Tx3 are the same as the width and length of 1-3 touch electrode Tx3. 1-2 touch electrodes Tx21 to Tx28 of the first touch electrodes Tx1, Tx21 to Tx28 and Tx3 are disposed at left side and right side of the combination fingerprint and touch area FTA. Each of the 1-2 touch electrodes Tx21 to Tx28 has a width and a length that is smaller than the width and length of the 1-1 touch electrode Tx1 or the 1-3 touch electrode Tx3.

The 1-1, 1-2 and 1-3 touch electrodes Tx1, Tx21 to Tx28 and Tx3 and the first fingerprint and touch electrodes FTx1 to FTx8 are arranged in parallel to the first direction on a substrate SUB.

The second touch electrodes Rx1 and Rx2 and the second fingerprint and touch electrodes FRx1 to FRx8 are arranged in parallel to the second direction on an insulation layer INS covering the 1-1, 1-2 and 1-3 touch electrodes Tx1, Tx21 to Tx28 and Tx3. The second fingerprint and touch electrodes FRx1 to FRx8 are also disposed to overlap the 1-1 touch electrodes Tx1 and Tx3 positioned at lower side and upper side of the combination fingerprint and touch area FTA in FIG. 3. The second fingerprint and touch electrodes FRx1 to FRx8 are also disposed to overlap the first fingerprint and touch electrodes FTx1 to FTx8 in the combination fingerprint and touch area FTA.

First fingerprint and touch routing wires FTW1 to FTW8 are connected to the first fingerprint and touch electrodes FTx1 to FTx8, and extended from the active area AA to the bezel area BA. In the embodiment, the first fingerprint and touch routing wires FTW1 to FTW8 includes 1-1 fingerprint and touch routing wires FTW1, FTW3, FTW5 and FTW7 and 1-2 fingerprint and touch routing wires FTW2, FTW4, FTW6 and FTW8. The 1-1 fingerprint and touch routing wires FTW1, FTW3, FTW5 and FTW7 are positioned at odd-numbered rows and connected to 1-1 fingerprint and touch electrodes FTx1, FTx3, FTx5 and FTx7 positioned at odd-numbered rows. The 1-1 fingerprint and touch routing wires FTW1, FTW3, FTW5 and FTW7 are also disposed on the 1-2 left touch electrodes Tx21, Tx23, Tx25 and Tx27 positioned at left side of the combination fingerprint and touch area FTA. The 1-2 fingerprint and touch routing wires FTW2, FTW4, FTW6 and FTW8 are positioned at even-numbered rows and connected to 1-2 fingerprint and touch electrodes FTx2, FTx4, FTx6 and FTx8 positioned at even-numbered rows. The 1-2 fingerprint and touch routing wires FTW2, FTW4, FTW6 and FTW8 are also disposed on the 1-2 right touch electrodes Tx22, Tx24, Tx26 and Tx28 positioned at right side of the fingerprint/touch area FTA. Accordingly, the 1-1 fingerprint and touch routing wires FTW1, FTW3, FTW5 and FTW7 are connected to the 1-2 left touch electrodes Tx21, Tx23, Tx25 and Tx27, respectively, and the 1-2 fingerprint and touch routing wires FTW2, FTW4, FTW6 and FTW8 are connected to the 1-2 right touch electrodes Tx22, Tx24, Tx26 and Tx28, respectively. In this embodiment, the number of the first fingerprint and touch electrodes FTx1 to FTx8 disposed in the combination fingerprint and touch area FTA is the same to the number of the 1-2 touch electrodes Tx21 to Tx28 positioned at both sides of the combination fingerprint and touch area FTA.

Figure 5:
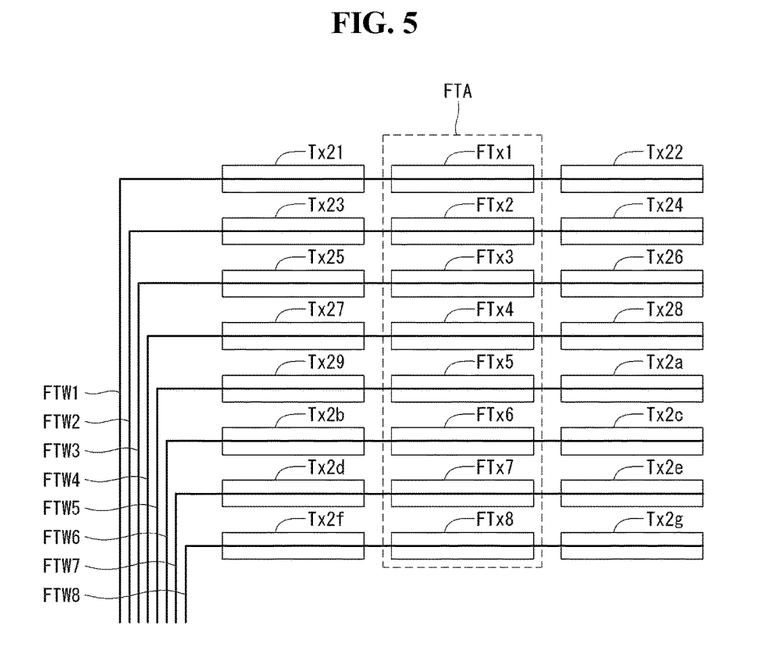
FIG. 5 is a plan view illustrating an example of connection relationship of fingerprint and touch electrodes in a fingerprint and touch area and touch electrodes in both sides of the fingerprint and touch area in the fingerprint sensor integrated type capacitive touch screen panel according to an embodiment of the disclosure.

Alternative, each of the first fingerprint and touch routing wires FTW1 to FTW8 may be arranged as shown in FIG. 5. FIG. 5 is a plan view illustrating an example of connection relationship of the first fingerprint and touch electrodes FTx1 to FTx8 in the combination fingerprint and touch area FTA and touch electrodes on both sides of the combination fingerprint and touch area FTA in the embodiment of the disclosure.

Referring to FIG. 5, there are 1-2 left touch electrodes Tx21, Tx23, Tx25, Tx27, Tx29, Tx2b, Tx2d and Tx2f in the active area AA at left side of the combination fingerprint and touch area FTA. The amount of 1-2 left touch electrodes Tx21, Tx23, Tx25, Tx27, Tx29, Tx2b, Tx2d and Tx2f is the same as the amount of first fingerprint and touch electrodes FTx1 to FTx8 disposed in the combination fingerprint and touch area FTA. Also, there are 1-2 right touch electrodes Tx22, Tx24, Tx26, Tx28, Tx2a, Tx2c, Tx2e and Tx2g in the active area AA at right side of the combination fingerprint and touch area FTA. The amount of the 1-2 right touch electrodes Tx22, Tx24, Tx26, Tx28, Tx2a, Tx2c, Tx2e and Tx2g is also the same as the amount of first fingerprint and touch electrodes FTx1 to FTx8 disposed in the combination fingerprint and touch area FTA.

The first fingerprint and touch routing wires FTW1 to FTW8 are disposed to contact the 1-2 left touch electrodes Tx21, Tx23, Tx25, Tx27, Tx29, Tx2b, Tx2d, Tx2f, first fingerprint and touch electrodes FTx1 to FTx8 and the 1-2 right touch electrodes Tx22, Tx24, Tx26, Tx28, Tx2a, Tx2c, Tx2e, Tx2g disposed on a same row.

According to the construction, a first row fingerprint and touch line is formed because the first fingerprint and touch routing wire FTW1 at a first row connects the 1-2 left electrode Tx21 at the first row, the first fingerprint and touch electrodes FTx1 at the first row and the 1-2 right electrode Tx22 at the first row to each other.

Also, a second row fingerprint and touch line is formed because the first fingerprint and touch routing wire FTW2 at a second row connects the 1-2 left electrode Tx23 at the second row, the first fingerprint and touch electrodes FTx2 at the second row and the 1-2 right electrode Tx24 at the second row to each other.

Also, a third row fingerprint and touch line is formed because the first fingerprint and touch routing wire FTW3 at a third row connects the 1-2 left electrode Tx25 at the third row, the first fingerprint and touch electrodes FTx3 at the third row and the 1-2 right electrode Tx26 at the third row to each other.

Also, a fourth row fingerprint and touch line is formed because the first fingerprint and touch routing wire FTW4 at a fourth row connects the 1-2 left electrode Tx27 at the fourth row, the first fingerprint and touch electrodes FTx4 at the fourth row and the 1-2 right electrode Tx28 at the fourth row to each other.

Also, a fifth row fingerprint and touch line is formed because the first fingerprint and touch routing wire FTW5 at a fifth row connects the 1-2 left electrode Tx29 at the fifth row, the first fingerprint and touch electrodes FTx5 at the fifth row and the 1-2 right electrode Tx2a at the fifth row to each other.

Also a sixth row fingerprint and touch line is formed because the first fingerprint and touch routing wire FTW6 at a sixth row connects the 1-2 left electrode Tx2b at the sixth row, the first fingerprint and touch electrodes FTx6 at the sixth row and the 1-2 right electrode Tx2c at the sixth row to each other.

Also, a seventh row fingerprint and touch line is formed because the first fingerprint and touch routing wire FTW7 at a seventh row connects the 1-2 left electrode Tx2d at the seventh row, the first fingerprint and touch electrodes FTx7 at the seventh row and the 1-2 right electrode Tx2e at the seventh row to each other.

Also, an eighth row fingerprint and touch line is formed because the first fingerprint and touch routing wire FTW8 at an eighth row connects the 1-2 left electrode Tx2f at the eighth row, the first fingerprint and touch electrodes FTx8 at the eighth row and the 1-2 right electrode Tx2g at the eighth row to each other.

According to the embodiment of FIG. 5, the amount of first fingerprint and touch electrodes FTx1 to FTx8 disposed in the combination fingerprint and touch area FTA is half of the amount of 1-2 touch electrodes Tx21 to Tx2g disposed in the active area AA at both sides of the combination fingerprint and touch area FTA.

Otherwise, each of first fingerprint and touch electrodes FTx1 to FTx8 is integral with the 1-2 left touch electrodes Tx21, Tx23, Tx25, Tx27, Tx29, Tx2b, Tx2d and Tx2f and 1-2 right touch electrodes Tx22, Tx24, Tx26, Tx28, Tx2a, Tx2c, Tx2e and Tx2g, at each row, thereby forming eight fingerprint and touch lines.

The bezel area BA includes 1-1 left touch routing wires TW1a and TW3a, 1-1 right touch routing wires TW1b and TW3b, odd-numbered 1-1 fingerprint and touch routing wires FTW1, FTW3, FTW5 and FTW7, even-numbered 1-2 fingerprint and touch routing wires FTW2, FTW4, FTW6 and FTW8, second touch routing wires RW1 and RW2 and the second fingerprint and touch routing wires FRW1 to FRW8. The 1-1 left touch routing wires TW1a and TW3a are connected to one end of the 1-1 touch electrodes Tx1 and Tx3, respectively. The 1-1 right touch routing wires TW1b and TW3b are connected to another end of the 1-1 touch electrodes Tx1 and Tx3, respectively. The odd-numbered 1-1 fingerprint and touch routing wires FTW1, FTW3, FTW5 and FTW7 are connected to the odd-numbered 1-1 fingerprint and touch electrodes FTx1, FTx3, FTx5 and FTx7 and the 1-2 left touch electrodes Tx21, Tx23, Tx25 and Tx27, respectively at each row. The odd-numbered 1-1 fingerprint and touch routing wires FTW1, FTW3, FTW5 and FTW7 are also extended from the active area AA to the left bezel area BA. The even-numbered 1-2 fingerprint and touch routing wires FTW2, FTW4, FTW6 and FTW8 are connected to the even-numbered 1-1 fingerprint and touch electrodes FTx2, FTx4, FTx6 and FTx8 and the 1-2 right touch electrodes Tx22, Tx24, Tx26 and Tx28, respectively at each row. The even-numbered 1-1 fingerprint and touch routing wires FTW2, FTW4, FTW6 and FTW8 are also extended from the active area AA to the right bezel area BA. The second touch routing wires RW1 and RW2 are connected to the second touch electrodes Rx1 and Rx2, respectively. The second fingerprint and touch routing wires FRW1 to FRW8 are connected to the second fingerprint and touch electrodes FRx1 to FRx8, respectively.

The fingerprint sensor integrated type touch screen panel according to the embodiment of the disclosure further includes a readout IC ROIC and a fingerprint and touch controller FTC.

Figure 6:
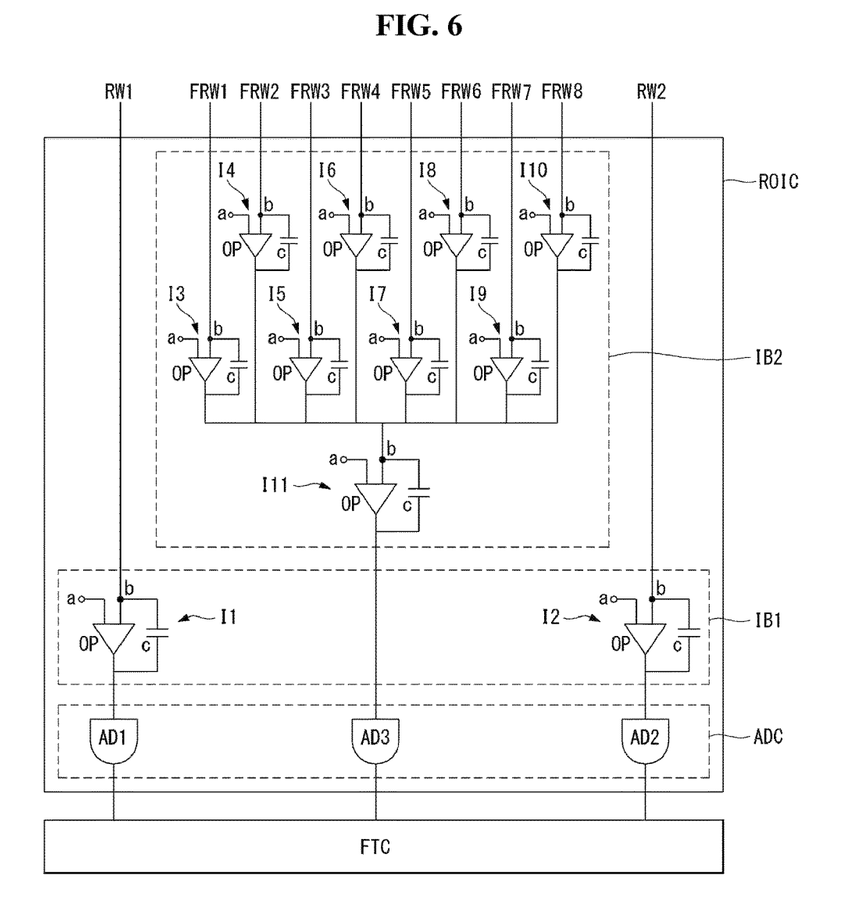
FIG. 6 is a circuit diagram illustrating an example of the readout IC shown in FIG. 3 according to an embodiment of the disclosure.
Figure 7:
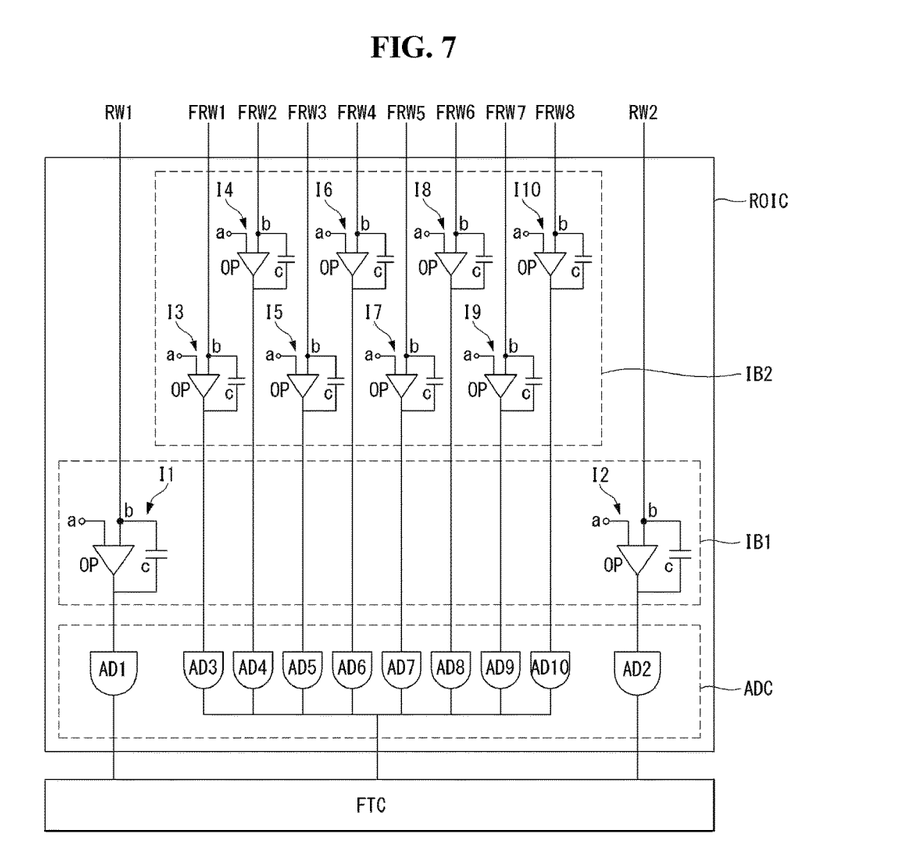
FIG. 7 is a circuit diagram illustrating another example of the readout IC shown in FIG. 3 according to an embodiment of the disclosure.

Hereinafter, the readout IC ROIC will be described with reference to FIGS. 6 and 7. FIG. 6 is a circuit diagram illustrating an example of the readout IC shown in FIG. 3, and FIG. 7 is a circuit diagram illustrating another example of the readout IC shown in FIG. 3.

Referring to FIG. 6, the readout IC ROIC includes a first integration block IB1, a second integration block IB2 and an analog-to-digital (A/D) conversion block ADC.

The first integration block IB1 includes a first integrator I1 and a second integrator I2. The first integrator I1 is connected to the 2-1 touch electrode Rx1 through the 2-1 routing wire RW1. The second integrator I2 is connected to the 2-2 touch electrode Rx2 through the 2-1 routing wire RW2.

The second integration block IB2 includes third to eleventh integrators I3 to I11. The third to tenth integrators I3 to I10 are connected to the second fingerprint and touch electrodes FRx1 to FRx8 through the second fingerprint and touch routing wires FRW1 to FRW8, respectively. The eleventh integrator I11 adds the integration values output from the third to tenth integrator I3 to I10 and output it to the A/D conversion block ADC.

The A/D conversion block ADC includes a first A/D converter AD1, a second A/D converter AD2 and a third A/D converter AD3. The first A/D converter AD1 converts a first analog sensing data corresponding to a first integration value received from the first integrator I1 to a first digital sensing data. The second A/D converter AD2 converts a second analog sensing data corresponding to a second integration value received from the second integrator I2 to a second digital sensing data. The third A/D converter AD3 converts a third analog sensing data corresponding to a third integration value received from the eleventh integrator I11 to a third digital sensing data.

The fingerprint and touch controller FTC analyzes the first to third digital sensing data received from the first and second A/D converters AD1 to AD2 of the A/D conversion block ADC using a publicly known touch recognition algorism, and calculates coordinate values of touch position during a touch operation. The fingerprint and touch controller FTC analyzes the third digital sensing data received from the third A/D converter AD3 of the readout IC ROIC using a publicly known fingerprint recognition algorism, and recognizes fingerprints during a fingerprint operation.

Each of first to eleventh integrators I1 to I11 in the first and second integration blocks IB1 and IB2 has an operational amplifier OP and a capacitor C. The operational amplifier OP has a first input terminal connected to a reference voltage source, a second input terminal connected to one of the second touch routing wires RW1 and RW2 and the second fingerprint and touch routing wires FRW1 to FRW8, and an output terminal connected to the A/D conversion block ADC. The capacitor C is connected in parallel to the operational amplifier OP. That is, the capacitor C is connected between the second input terminal b of the operational amplifier OP and the output terminal of the operational amplifier OP.

The connections relationship between the first to eleventh integrators I1 to I11 and the second touch and second fingerprint/touch routing wires RW1, RW2 and FRW1 to FRW8 are as follows.

The reference voltage source (not shown) is connected to the first input terminal a of the first integrator I1, the 2-1 touch routing wire RW1 is connected to the second input terminal b of the first integrator I1, and the capacitor C1 is connected between the second input terminal b and the output terminal of the first integrator I1.

The reference voltage source is connected to the first input terminal a of the first integrator I2, the 2-2 touch routing wire RW2 is connected to the second input terminal b of the second integrator I2, and the capacitor C2 is connected between the second input terminal b and the output terminal of the second integrator I2.

The reference voltage source is connected to the first input terminal a of the third integrator I3, the 2-1 fingerprint and touch routing wire FRW1 is connected to the second input terminal b of the third integrator I3, and the capacitor C3 is connected between the second input terminal b and the output terminal of the third integrator I3.

The reference voltage source is connected to the first input terminal a of the fourth integrator I4, the 2-2 fingerprint and touch routing wire FRW2 is connected to the second input terminal b of the fourth integrator I4, and the capacitor C4 is connected between the second input terminal b and the output terminal of the fourth integrator I4.

The reference voltage source is connected to the first input terminal a of the fifth integrator I5, the 2-3 fingerprint and touch routing wires FRW3 is connected to the second input terminal b of the first integrator I5, and the capacitor C5 is connected between the second input terminal b and the output terminal of the fifth integrator I5.

The reference voltage source is connected to the first input terminal a of the sixth integrator I6, the 2-4 fingerprint and touch routing wires FRW4 is connected to the second input terminal b of the sixth integrator I6, and the capacitor C6 is connected between the second input terminal b and the output terminal of the sixth integrator I6.

The reference voltage source is connected to the first input terminal a of the seventh integrator I7, the 2-5 fingerprint and touch routing wires FRW5 is connected to the second input terminal b of the seventh integrator I7, and the capacitor C7 is connected between the second input terminal b and the output terminal of the seventh integrator I7.

The reference voltage source is connected to the first input terminal a of the eighth integrator I8, the 2-6 fingerprint and touch routing wires FRW6 is connected to the second input terminal b of the eighth integrator I8, and the capacitor C7 is connected between the second input terminal b and the output terminal of the eighth integrator I8.

The reference voltage source is connected to the first input terminal a of the ninth integrator I9, the 2-7 fingerprint and touch routing wires FRW7 is connected to the second input terminal b of the ninth integrator I9, and the capacitor C7 is connected between the second input terminal b and the output terminal of the ninth integrator I9.

The reference voltage source is connected to the first input terminal a of the tenth integrator I10, the 2-8 fingerprint and touch routing wires FRW8 is connected to the second input terminal b of the tenth integrator I10, and the capacitor C7 is connected between the second input terminal b and the output terminal of the tenth integrator I10.

The reference voltage source is connected to the first input terminal a of the eleventh integrator I11, the output terminals of the third to tenth integrators I3 to I10 are connected to the second input terminal b of the eleventh integrator I11, and the capacitor C7 is connected between the second input terminal b and the output terminal of the eleventh integrator I11.

According to the construction mentioned above, during a touch operation, touch driving voltages are respectively supplied to the first touch electrodes Tx1 and Tx3 through the first touch routing wires TW1a, TW1b, TW3a and TW3b, to the first fingerprint and touch electrodes FTx1 to FTx8 through the first fingerprint and touch routing wires FTW1 to FTW8. The touch driving voltages may be supplied by the fingerprint and touch controller FTC or an individual power supplier.

Hereinafter, operation of the readout IC ROIC shown in FIG. 6 will be described in detail.

The touch driving voltages may be supplied to the first fingerprint and touch electrodes FTx1 to FTx8 after grouping the first fingerprint and touch routing wires FTW1 to FTW8 as one line by a switching device (not shown), or through each of the first fingerprint and touch routing wires FTW1 to FTW8.

During a touch operation, the first and second integrators I1 and I2 of the first integration block IB1 integrate the first and second sensing voltages generated by mutual capacitances between the first touch electrodes Tx1 and Tx3 and the second electrodes Rx1 and Rx 3, respectively. The first and second sensing voltages are sensed through the first touch routing wires RW1 and RW2, respectively. The first and second integrators I1 and I2 output also first and second analog sensing data corresponding to the first and second integration values of the first and second sensing voltages to the A/D conversion block ADC, respectively.

The third to tenth integrators I3 and I10 of the second integration block IB2 integrate the third sensing voltages generated by mutual capacitances between the first fingerprint and touch electrodes FTx1 to FTx8 and the second fingerprint/touch electrodes FRx1 to FRx8, respectively. The third sensing voltages are sensed through the second fingerprint/touch routing wires FRW1 to FRW8. The third to tenth integrators I3 and I10 output also third analog sensing data corresponding to the third integration values of the third sensing voltages to the eleventh integrator I11

The eleventh integrator I11 of the second integration block IB integrates the third analog sensing data output from the third to tenth integrators I3 and I10 and output it to the A/D conversion block ADC.

The first to third A/D converters AD1, AD2 and AD3 convert the first to third analog sensing data to first to third digital sensing data, and output the first to third digital sensing data to the fingerprint and touch controller FTC.

The fingerprint and touch controller FTC analyzes the digital sensing data (corresponding to the first to third sensing voltages) received from the first to third A/D converters AD1, AD2 and AD3 using a publicly known touch recognition algorism, and calculates coordinate values of touch positions.

During a fingerprint operation, fingerprint driving voltages are supplied to the first fingerprint and touch electrodes FTx1 to FTx8 through the first fingerprint and touch routing wires FTW1 to FTW8. The fingerprint driving voltages may be supplied by the fingerprint and touch controller FTC or an individual power supplier.

The fingerprint driving voltages may be supplied to the first fingerprint and touch electrodes FTx1 to FTx8 after grouping the first fingerprint and touch routing wires FTW1 to FTW8 as one line by a switching device (not shown), or through each of the first fingerprint and touch routing wires FTW1 to FTW8.

During the fingerprint operation, the third to tenth integrators I3 and I10 of the second integration block IB2 integrate fourth sensing voltages generated by mutual capacitances between the first fingerprint and touch electrodes FTx1 to FTx8 and the second fingerprint and touch electrodes FRx1 to FRx8, respectively. The eleventh integrator I11 of the second integration block IB2 integrates the fourth analog sensing voltages output from the third to tenth integrators I3 and I10. The third A/D converter AD3 converts the fourth analog sensing data to third digital sensing data, and output the four digital sensing data to the fingerprint and touch controller FTC.

The fingerprint and touch controller FTC analyzes the fourth digital sensing data received from the third A/D converter AD3 using a publicly known fingerprint recognition algorism, and recognizes fingerprints.

According to the readout IC ROIC in the embodiment of FIG. 6, it is possible to reduce the number of output channels because the third analog sensing data output from only the output terminal of the eleventh integrator I11 positioned at final output terminal of the second integration block IB2 is accumulated.

Referring to FIG. 7, the readout IC ROIC includes a first integration block IB1, a second integration block IB2 and an analog-to-digital (A/D) conversion block ADC.

The first integration block IB1 includes a first integrator I1 and a second integrator I2. The first integrator I1 is connected to the 2-1 touch electrode Rx1 through the 2-1 routing wire RW1. The second integrator I2 is connected to the 2-2 touch electrode Rx2 through the 2-1 routing wire RW2

The second integration block IB2 includes third to eleventh integrator I3 to I11. The third to eleventh integrator I3 to I10 are connected to the second fingerprint/touch electrodes FRx1 to FRx8 through the second fingerprint/touch routing wires FRW1 to FRW8, respectively.

The A/D conversion block ADC includes a first A/D converter AD1, a second A/D converter AD2 and third to tenth A/D converters AD3 to AD10. The first A/D converter AD1 converts a first analog sensing data corresponding to a first integration value of the first sensing voltage received from the first integrator I1 to a first digital sensing data. The second A/D converter AD2 converts a second analog sensing data corresponding to a second integration value of the second sensing voltage received from the second integrator I2 to a second digital sensing data. The third to tenth A/D converters AD3 to AD10 convert third analog sensing data corresponding to the third integration values of the third sensing voltages received from the third to tenth integrator I3 to I11 to third digital sensing data, respectively.

During a touch operation, the fingerprint and touch controller FTC analyzes the first to third digital sensing data received from the first to third A/D converters AD1 to AD3 of the A/D conversion block ADC using a publicly known touch recognition algorithm, and calculates coordinate values of touch position. During a fingerprint operation, the fingerprint and touch controller FTC analyzes also the third digital sensing data received from the third to tenth A/D converter AD3 to AD10 of the A/D conversion block ADC using a publicly known fingerprint recognition algorism, and recognizes fingerprints.

Hereinafter, the readout IC ROIC shown in FIG. 7 will be described in detail.

Each of first to tenth integrators I1 to I10 in the first and second integration blocks IB1 and IB2 has an operational amplifier OP and a capacitor C. The operational amplifier OP has a first input terminal connected to a reference voltage source, a second input terminal connected to one of the second touch routing wires RW1 and RW2 and the second fingerprint and touch routing wires FRW1 to FRW8, and an output terminal connected to the A/D conversion block ADC. The capacitor C is connected in parallel to the operational amplifier OP. That is, the capacitor C is connected between the second input terminal b of the operational amplifier OP and the output terminal of the operational amplifier OP.

The connection relationship between the first to tenth integrators I1 to I10 and the second touch routing and the second fingerprint and touch routing wires RW1, RW2 and FRW1 to FRW8 are as follows.

The reference voltage source (not shown) is connected to the first input terminal a of the first integrator I1, the 2-1 touch routing wire RW1 is connected to the second input terminal b of the first integrator I1, and the capacitor C is connected between the second input terminal b and the output terminal of the first integrator I1.

The reference voltage source is connected to the first input terminal a of the first integrator I2, the 2-2 touch routing wire RW2 is connected to the second input terminal b of the second integrator I2, and the capacitor C is connected between the second input terminal b and the output terminal of the second integrator I2.

The reference voltage source is connected to the first input terminal a of the third integrator I3, the 2-1 fingerprint and touch routing wire FRW1 is connected to the second input terminal b of the third integrator I3, and the capacitor C is connected between the second input terminal b and the output terminal of the third integrator I3.

The reference voltage source is connected to the first input terminal a of the fourth integrator I4, the 2-2 fingerprint and touch routing wire FRW2 is connected to the second input terminal b of the fourth integrator I4, and the capacitor C is connected between the second input terminal b and the output terminal of the fourth integrator I4.

The reference voltage source is connected to the first input terminal a of the fifth integrator I5, the 2-3 fingerprint and touch routing wires FRW3 is connected to the second input terminal b of the first integrator I5, and the capacitor C is connected between the second input terminal b and the output terminal of the fifth integrator I5.

The reference voltage source is connected to the first input terminal a of the sixth integrator I6, the 2-4 fingerprint and touch routing wires FRW4 is connected to the second input terminal b of the sixth integrator I6, and the capacitor C is connected between the second input terminal b and the output terminal of the sixth integrator I6.

The reference voltage source is connected to the first input terminal a of the seventh integrator I7, the 2-5 fingerprint and touch routing wires FRW5 is connected to the second input terminal b of the seventh integrator I7, and the capacitor C is connected between the second input terminal b and the output terminal of the seventh integrator I7.

The reference voltage source is connected to the first input terminal a of the eighth integrator I8, the 2-6 fingerprint and touch routing wires FRW6 is connected to the second input terminal b of the eighth integrator I8, and the capacitor C is connected between the second input terminal b and the output terminal of the eighth integrator I8.

The reference voltage source is connected to the first input terminal a of the ninth integrator I9, the 2-7 fingerprint and touch routing wires FRW7 is connected to the second input terminal b of the ninth integrator I9, and the capacitor C is connected between the second input terminal b and the output terminal of the ninth integrator I9.

The reference voltage source (not shown) is connected to the first input terminal a of the tenth integrator I10, the 2-8 fingerprint and touch routing wires FRW8 is connected to the second input terminal b of the tenth integrator I10, and the capacitor C is connected between the second input terminal b and the output terminal of the tenth integrator I10.

According to the construction mentioned above, during a touch operation, touch driving voltages are supplied to the first touch electrodes Tx1 and Tx3 through the first touch routing wires TW1a, TW1b, TW3a and TW3b, to the first fingerprint and touch electrodes FTx1 to FTx8 through the first fingerprint/touch routing wires FTW1 to FTW8. The touch driving voltages may be supplied by the fingerprint and touch controller FTC or an individual power supplier.

The touch driving voltages may be supplied to the first fingerprint and touch electrodes FTx1 to FTx8 after grouping the first fingerprint and touch routing wires FTW1 to FTW8 as one line by a switching device (not shown), or through each of the first fingerprint/touch routing wires FTW1 to FTW8.

During a touch operation, the first and second integrators I1 and I2 of the first integration block IB1 integrate the first and second sensing voltages generated by mutual capacitances between the first touch electrodes Tx1 and Tx3 and the second electrodes Rx1 and Rx 3, respectively. The mutual capacitances are sensed through the first touch routing wires RW1 and RW2. The first and second integrators I1 and I2 of the first integration block IB1 output also the first and second analog sensing data corresponding to the first and second integration of the first and second sensing voltages to the A/D conversion block ADC, respectively.

The third to tenth integrators I3 and I10 of the second integration block IB2 integrate the third sensing voltages generated by mutual capacitances between the first fingerprint and touch electrodes FTx1 to FTx8 and the second fingerprint/touch electrodes FRx1 to FRx8, respectively. The mutual capacitances are sensed through the second fingerprint and touch routing wires FRW1 to FRW8. The third to tenth integrators I3 and I10 output also the third analog sensing data corresponding to the third integration values of the third sensing voltages to the A/D conversion block ADC, respectively.

The first and second A/D converters AD1 to AD3 convert the first and second analog sensing data to a first and second digital sensing data, and output the first and second digital sensing data to the fingerprint and touch controller FTC. The third to tenth A/D converters AD3 to AD10 convert the third analog sensing data to third digital sensing data, and output the third digital sensing data to the fingerprint and touch controller FTC.

In the touch operation, the fingerprint and touch controller FTC analyzes the first to third digital sensing data received from the first to tenth A/D converters AD1 to AD10 using a publicly known touch recognition algorithm, and calculates coordinate values of touch positions.

During a fingerprint operation, fingerprint driving voltages are supplied to the first fingerprint and touch electrodes FTx1 to FTx8 through the first fingerprint and touch routing wires FTW1 to FTW8. The fingerprint driving voltages may be supplied by the fingerprint and touch controller FTC or an individual power supplier.

The fingerprint driving voltages may be supplied to the first fingerprint and touch electrodes FTx1 to FTx8 after grouping the first fingerprint/touch routing wires FTW1 to FTW8 as one line by a switching device (not shown), or through each of the first fingerprint/touch routing wires FTW1 to FTW8.

During the fingerprint operation, the third to tenth integrators I3 and I10 of the second integration block IB2 integrate fourth sensing voltages generated by mutual capacitances between the first fingerprint and touch electrodes FTx1 to FTx8 and the second fingerprint/touch electrodes FRx1 to FRx8, respectively. The third to tenth A/D converter AD3 to AD10 convert the fourth analog sensing data to fourth digital sensing data, and output the fourth digital sensing data to the fingerprint/touch controller FTC.

During the fingerprint operation, the fingerprint and touch controller FTC analyzes the fourth digital sensing data received from the third to tenth A/D converter AD3 to AD10 using a publicly known fingerprint recognition algorism, and recognizes fingerprints.

According to the readout IC ROIC in the embodiment of FIG. 7, it is possible to enhance processing speed of the touch recognition because the analog sensing data from the third to tenth integrators I3 to I10 are independently converted by the third to tenth A/D converters AD3 to AD10.

Next, a cross-sectional construction of the fingerprint sensor integrated type touch screen panel according to the embodiment of the disclosure will be described in detail mainly with FIG. 4

The first fingerprint and touch electrodes FTx1 to FTx8 are disposed in parallel to the first direction in the combination fingerprint and touch area FTA of the active area AA on one surface of a substrate SUB. The 1-1 touch electrode Tx1, the 1-2 left touch electrodes Tx21, Tx23, Tx25 and Tx27, the 1-2 right touch electrodes Tx22, Tx24, Tx26 and Tx28 and the 1-3 touch electrode Tx3 are disposed in the active area AA outside the fingerprint and touch area FTA. The 1-1 touch electrode Tx1 is disposed at upper side of the fingerprint and touch area FTA. The 1-2 left touch electrodes Tx21, Tx23, Tx25 and Tx27 are disposed at left side of the fingerprint and touch area FTA. The 1-2 right touch electrodes Tx22, Tx24, Tx26 and Tx28 are disposed at right side of the fingerprint and touch area FTA. The 1-3 touch electrode Tx3 is disposed at lower side of the fingerprint/touch area FTA.

The 1-1 fingerprint and touch routing wires FTW1, FTx3, FTx5 and FTx7 are disposed directly on the 1-2 left touch electrodes Tx21, Tx23, Tx25 and Tx27, respectively. The 1-1 fingerprint/touch routing wires FTW1, FTW3, FTW5 and FTW7 are also connected to one ends of the odd-numbered 1-1 fingerprint and touch electrodes FTx1, FTx3, FTx5 and FTx7.

The 1-2 fingerprint and touch routing wires FTW2, FTx4, FTx6 and FTx8 are disposed directly on the 1-2 right touch electrodes Tx22, Tx24, Tx26 and Tx28, respectively. The 1-2 fingerprint and touch routing wires FTW2, FTx4, FTx6 and FTx8 are also connected to one ends of the even-numbered 1-2 fingerprint/touch electrodes FTx2, FTx4, FTx6 and FTx8.

On the bezel area BA outside the active area AA on one surface of the substrate SUB, the 1-1 touch routing wires TW1a and TW1b, the 1-3 touch routing wires TW3a and TW3b, the second touch routing wires RW1 and RW2, and the second fingerprint and touch routing wires FRW1 to FRW8. The 1-1 touch routing wires TW1a and TW1b are connected to both ends of the 1-1 touch electrode Tx1, respectively. The 1-3 touch routing wires TW3a and TW3b are connected to both ends of the 1-3 touch electrode Tx1, respectively. The second touch routing wires RW1 and RW2 are connected to the second touch electrodes Rx1 and Rx2 which will be later described, respectively. The second fingerprint and touch routing wires FRW1 to FRW8 are connected to the second fingerprint/touch electrodes FRx1 to FRx8 which will be later describe, respectively.

In the embodiment, it is described that the first touch routing wires TW1a and TW1b; TW3a and TW3b are connected to both ends of the first touch electrodes Tx1 and Tx3, respectively, but the invention is not limited thereto. For, example, the first routing wires are connected to only one ends of the first touch electrodes Tx1 and Tx3. The former is appropriate to large products because it is possible to reduce attenuation of the touch driving signal or fingerprint driving signal, thereby enhancing sensibilities of touch recognition and fingerprint recognition, while the latter is appropriate to small products because it is possible to decrease the number of routing wires, thereby reducing a bezel area.

An insulation layer INS is disposed on the substrate SUB to cover the first fingerprint and touch routing wires FTW1 to FTW8, the first touch routing wires TW1a, TW1b, TW3a and TW3b), the second touch routing wires RW1 and RW2, and the second fingerprint and touch routing wires FRW1 to FRW8. The second touch electrodes Rx1 and Rx2 and the second fingerprint/touch electrodes FRx1 to FRx8 are arranged in parallel to each other on the insulation layer INS.

The 2-1 touch electrode Rx1 is disposed on the insulation layer INS to cross over the 1-1 touch electrode Tx1, the 1-2 left touch electrodes Tx21, Tx23, Tx25 and Tx27, and the 1-3 touch electrode Tx3. The 2-2 touch electrode Rx2 is disposed on the insulation layer INS to cross over the 1-1 touch electrode Tx1, the 1-2 right touch electrodes Tx22, Tx24, Tx26 and Tx28 and the 1-3 touch electrode Tx3.

The 2-1 and 2-2 touch electrodes Rx1 and Rx2 are connected to the 2-1 and 2-2 touch routing wires RW1 and RW2, respectively through contact holes (not shown) passing through the insulation layer INS. The second fingerprint and touch electrodes FRx1 to FRx8 are connected to the second fingerprint and touch routing wires FRW1 to FRW8, respectively through contact holes (not shown) passing through the insulation layer INS.

In the construction mentioned above, the first touch electrodes Tx1, Tx21 to Tx28 and Tx3 and the first fingerprint and touch electrodes FTx1 to FTx8 are made of transparent conductive material such as ITO, IZO and GZO, or metal material having lower reflectivity such as chrome oxide, or blackened metal material such as Mo.

The second electrodes Rx1 and Rx2, the second fingerprint/touch electrodes FRx1 to FRx8, the first touch routing wires TW1a, TW1b, TW3a and TW3b, the first fingerprint and touch routing wires FTW1 to FTW8, and the second fingerprint and touch routing wires FRW1 to FRW8 are made of metal material having lower reflectivity.

The fingerprint sensor integrated type touch screen panel according to the embodiment of the disclosure is operated in a time division method as mentioned above. Generally, in the time division method a touch period of the fingerprint sensor integrated type touch screen panel includes both a touch driving mode for sensing touch and a fingerprint mode for sensing a fingerprint. The touch driving mode and the fingerprint mode do not overlap in the touch period. During the touch driving mode, the FTC applies the touch driving voltage for sensing touch to the touch electrodes and the combination fingerprint and touch electrodes. During the fingerprint mode, the FTC applies the fingerprint driving voltage for sensing a fingerprint to the combination fingerprint and touch electrodes. However, the fingerprint sensor integrated type capacitive touch screen panel may be operated in the manner of that it is operated according to the fingerprint driving method only when it receives an instruction of a fingerprint operation from outside while it is operated in the touch driving method.

According to exemplary embodiments of the disclosure, it is possible to design the fingerprint sensor integrated type touch screen panel having a narrow bezel area because it is unnecessary to have a fingerprint sensor region in the bezel area.

Also, it is possible to prevent a dead zone from being generated in an active area of the fingerprint sensor integrated type touch screen panel because fingerprint and touch electrodes are arranged in a fingerprint/touch area of the display area to implement the touch/fingerprint recognitions.

Also, it is possible to prevent touch sensitivity of the fingerprint sensor integrated type touch screen panel from being degraded because the touch electrodes consist of large patterns and the fingerprint and touch patterns consist of fine patterns.

Also, it is possible to enhance touch sensibilities because the overlap area of the first fingerprint and touch routing wires and the second touch electrodes are minimized, thereby reducing the parasitic capacitance therebetween.

Also, the total resistance of the 1-2 touch electrodes Tx21 to Tx28 shown in FIG. 3 is smaller than that of Tx21 to Tx2g shown in FIG. 5 because the total surface area of the 2-1 touch electrodes Tx21 to Tx28 shown in FIG. 3 (that is, the total surface area of the 2-1 touch electrodes Tx21 to Tx28 in case that each of the 1-2 touch electrodes Tx21 to Tx28 has a width and a length smaller than those of each the 1-1 touch electrode Tx1 or the 1-3 touch electrode Tx3, and has the width larger than that of the first fingerprint and touch electrodes FTx1 to FTx8) is larger than that of the 2-1 touch electrodes Tx21 to Tx2g shown in FIG. 5 (that is, the total surface area of the 2-1 touch electrodes Tx21 to Tx2g in case that each the 1-2 touch electrodes Tx21 to Tx2g has a width same to that of each the first fingerprint and touch electrodes FTx1 to FTx8). Accordingly, it is possible to reduce the total resistance of the 2-1 touch electrodes Tx21 to Tx28 when the touch driving voltages or the fingerprint driving voltages are supplied.

Also, according to exemplary embodiment of the disclosure, the integrators I1 to I11 for a touch sensing operation and a fingerprint sensing operation are independently provided in the integration blocks IB1 and IB2 to use them independently. Accordingly, it is possible to enhance efficiency of the device. For example, it is possible to improve touch accuracy by reducing integration perform number during the touch operation and setting voltage level of the touch driving voltage lower than that of the fingerprint driving voltage.

Although exemplary embodiments have been illustrated and described, it will be apparent to those skilled in the art that various changes and modifications can be made without departing from the spirit of this disclosure. For example, it should be understood that the number of the touch electrodes, the fingerprint/electrodes, the integrators, the switching elements routing wires, various wires and so on is exemplary and explanatory, and is not intended to limit the scope of the invention. Thus, it is intended that embodiments of the invention cover the modifications and variations of this invention provided they come within the scope of the appended claims and their equivalents.

What is claimed is:

1. A touch sensing device comprising:
   a plurality of first touch electrodes located in an active area of the touch sensing device, the plurality of first touch electrodes arranged in a first direction;
   a plurality of second touch electrodes located in the active area of the touch sensing device, the plurality of second touch electrodes arranged in the first direction in parallel to the first touch electrodes;
   a plurality of third touch electrodes located in the active area of the touch sensing device and arranged in a second direction that crosses the first direction, the plurality of third touch electrodes overlapping both the plurality of first touch electrodes and the plurality of second touch electrodes in the active area, and the plurality of first touch electrodes, the plurality of second touch electrodes, and the plurality of third touch electrodes having a first resolution for sensing touch in the active area;
   a plurality of combination touch and fingerprint electrodes located in the active area of the touch sensing device, the plurality of combination touch and fingerprint electrodes having a second resolution for sensing both touch and a fingerprint in the active area and the second resolution being higher than the first resolution and wherein the plurality of combination touch and fingerprint electrodes include a plurality of first combination touch and fingerprint electrodes arranged in the first direction and a plurality of second combination touch and fingerprint electrodes arranged in a second direction that crosses the first direction;
   a plurality of first routing lines connected to the plurality of first touch electrodes and the plurality of third touch electrodes; and
   a plurality of second routing lines connected to the plurality of second touch electrodes and the plurality of combination touch and fingerprint electrodes,
   wherein each of the plurality of first touch electrodes is larger in size than each of the plurality of second touch electrodes and each of the plurality of third electrodes; and
   wherein the plurality of second touch electrodes disposed at both sides of the plurality of combination touch and fingerprint electrodes and each of the plurality of second touch electrodes has a width and a length that is smaller than the width and length of the plurality of the first touch electrodes.

2. The touch sensing device of claim 1, further comprising:
   a touch and fingerprint controller that respectively applies via the plurality of first routing lines and the plurality of second routing lines a touch driving voltage for sensing touch to the plurality of first touch electrodes, the plurality of second touch electrodes, and the plurality of combination touch and fingerprint sensors during a touch driving mode of a touch period of the touch sensing device, and the touch and fingerprint controller applying via the plurality of second routing lines a fingerprint driving voltage for sensing a fingerprint to the plurality of combination touch and fingerprint sensors during a fingerprint mode of the touch period, the fingerprint mode not overlapping with the touch driving mode.

3. The touch sensing device of claim 1, wherein the plurality of first touch electrodes, the plurality of second touch electrodes, and the plurality of third touch electrodes surround the plurality of combination touch and fingerprint electrodes in the active area.

4. The touch sensing device of claim 1, wherein the plurality of second combination touch and fingerprint electrodes extends across a length of the active area and overlaps a portion of the plurality of first touch electrodes.

5. The touch sensing device of claim 1, wherein the first plurality of routing lines and the second plurality of routing lines are located in a bezel area of the touch sensing device that surrounds the active area.

6. The touch sensing device of claim 5, wherein the first plurality of routing lines and the second plurality of routing lines extend from the bezel area of the touch sensing device to the active area of the touch sensing device.

7. The touch sensing device of claim 1, wherein the plurality of second routing lines are arranged directly on the plurality of second touch electrodes.

8. The touch sensing device of claim 1, wherein the second plurality of routing lines include a first set of routing lines and a second set of routing lines, the first set of routing lines connected to the plurality of first combination touch and fingerprint sensors and the second set of routing lines connected to the plurality of second combination touch and fingerprint sensors.

9. The touch sensing device of claim 8, wherein a first portion of the first set of routing lines are connected to odd-numbered first combination touch and fingerprint electrodes and wherein a second portion of the first set of routing lines are connected to even-numbered first combination touch and fingerprint electrodes.

10. The touch sensing device of claim 8, wherein each of the first set of routing lines is connected to a corresponding pair of second touch electrodes and a corresponding one of the plurality of first combination touch and fingerprint electrodes.

11. The touch sensing device of claim 1, wherein the plurality of first touch electrodes have a same width and a same length.

12. The touch sensing device of claim 1, wherein a first portion of the plurality of second touch electrodes is arranged on a first side of the plurality of combination touch and fingerprint electrodes, and wherein a second portion of the plurality of second touch electrodes is arranged on a second side of the plurality of combination touch and fingerprint electrodes, and wherein one of the plurality of first touch electrodes is arranged on a third side of the plurality of combination touch and fingerprint electrodes, and wherein another one of the plurality of first touch electrodes is arranged on a fourth side of the plurality of combination touch and fingerprint electrodes.

13. The touch sensing device of claim 1, further comprising a readout integrated circuit including:
   a first integration block comprising a plurality of integrators that integrate sensing data received from the plurality of second combination touch and fingerprint sensors via the second set of routing lines and an integrator that integrates the integrated sensing data received from the plurality of integrators, each of the integrators including a capacitor connected to an operational amplifier;
   a second integration block comprising a plurality of integrators that integrate sensing data received from the plurality of third touch electrodes via a portion of the first routing lines that are connected to the plurality of third touch electrodes, each of the plurality of integrators including a capacitor connected to an operational amplifier; and an analog-to-digital conversion block comprising a plurality of analog-to-digital converters that receive the integrated sensing data from the first integration block and the second integration block and convert the integrated sensing data into digital data that is transmitted to the touch and fingerprint controller.

14. The touch sensing device of claim 13, wherein the sensing data comprises touch sensing data and wherein during the touch driving mode the touch and fingerprint controller supplies the touch driving voltage to the plurality of first touch electrodes, the plurality of second touch electrodes, and the plurality of first combination touch and fingerprint sensors, and wherein each of the plurality of integrators included in the first integration block receive the touch sensing data from a corresponding one of the plurality of second combination touch and fingerprint sensors, and wherein the plurality of integrators included in the second integration block receive the touch sensing data from the plurality of third touch electrodes.

15. The touch sensing device of claim 13, wherein the sensing data comprises fingerprint sensing data and wherein during the fingerprint mode of the touch period the touch and fingerprint controller supplies the fingerprint driving voltage to the plurality of first combination touch and fingerprint sensors and each of the plurality of integrators included in the first integration block receive the fingerprint sensing data from a corresponding one of the plurality of second combination touch and fingerprint sensors.

16. The touch sensing device of claim 1, further comprising a readout integrated circuit including:

a first integration block comprising a plurality of integrators that integrate sensing data received from the plurality of second combination touch and fingerprint sensors, each of the integrators including a capacitor connected to an operational amplifier;

a second integration block comprising a plurality of integrators that integrate sensing data received from the plurality of third touch electrodes, each of the plurality of integrators including a capacitor connected to an operational amplifier; and an analog-to-digital conversion block comprising a plurality of analog-to-digital converters that receive the integrated sensing data from the first integration block and the second integration block and convert the integrated sensing data into digital data that is transmitted to the touch and fingerprint controller, wherein each analog-to-digital converter from a portion of the plurality of analog-to-digital converters receives integrated sensing data from a corresponding one of the plurality of integrators included in the first integration block.

17. The touch sensing device of claim 16, wherein the sensing data comprises touch sensing data and wherein during the touch driving mode the touch and fingerprint controller supplies the touch driving voltage to the plurality of first touch electrodes, the plurality of second touch electrodes, and the plurality of first combination touch and fingerprint sensors, and wherein each of the plurality of integrators included in the first integration block receive the touch sensing data from a corresponding one of the plurality of second combination touch and fingerprint sensors, and wherein the plurality of integrators included in the second integration block receive the touch sensing data from the plurality of third touch electrodes.

18. The touch sensing device of claim 16, wherein the sensing data comprises fingerprint sensing data and wherein during the fingerprint mode of the touch period the touch and fingerprint controller supplies the fingerprint driving voltage to the plurality of first combination touch and fingerprint sensors and each integrator of the plurality of integrators included in the first integration block receive fingerprint sensing data from a corresponding one of the plurality of second combination touch and fingerprint sensors.

19. The touch sensing device of claim 1, wherein a first end of each of the plurality of first touch electrodes is connected to one of the plurality of first routing lines and wherein a second end of each of the plurality of first touch electrodes is connected to another one of the plurality of first routing lines.

20. The touch sensing device of claim 1, wherein a first end of each of the plurality of first touch electrodes is connected to one of the plurality of first routing lines and wherein a second end of each of the plurality of first touch electrodes is not connected.

21. The touch sensing device of claim of claim 8, wherein the plurality of first touch electrodes, the plurality of second touch electrodes, and the plurality of first combination touch and fingerprint electrodes are formed over a substrate, and wherein the touch sensing device further comprises:

an insulation layer formed over the plurality of first touch electrodes, the plurality of second touch electrodes, and the plurality of first combination touch and fingerprint electrodes;

wherein the plurality of second touch electrodes and the plurality of second combination touch and fingerprint electrodes are formed over the insulation layer.

* * * * *